US012791376B2

(12) United States Patent
Ens et al.

(10) Patent No.: US 12,791,376 B2
(45) Date of Patent: Nov. 10, 2026

(54) METHOD FOR INSTALLING A LEVEL MEASURING DEVICE

(71) Applicant: Siemens Aktiengesellschaft, Munich (DE)

(72) Inventors: Wolfgang Ens, Linkenheim (DE); Jana Eder, Vienna (DE); Adam Lomas, Havelock (CA); Bramwell Perun, Otonabee (CA); Xin Zhao, Vienna (AT); Viraj Patel, Toronto (CA); Nan Long, Peterborough (CA); Matthew Stevens, Peterborough (CA)

(73) Assignee: Siemens Aktiengesellschaft, Munich (DE)

(*) Notice: Subject to any disclaimer, the term of this patent is extended or adjusted under 35 U.S.C. 154(b) by 273 days.

(21) Appl. No.: 18/621,254

(22) Filed: Mar. 29, 2024

(65) Prior Publication Data

US 2025/0305864 A1 Oct. 2, 2025

(51) Int. Cl.

| | |
|---|---|
| ***G01F 23/28*** | (2006.01) |
| ***G01F 23/284*** | (2006.01) |
| ***G01F 23/2962*** | (2022.01) |
| ***G01F 25/20*** | (2022.01) |

(52) U.S. Cl.

CPC .............. *G01F 23/28* (2013.01); *G01F 25/20* (2022.01); *G01F 23/284* (2013.01); *G01F 23/2962* (2013.01)

(58) Field of Classification Search

None

See application file for complete search history.

(56) References Cited

U.S. PATENT DOCUMENTS 8,776,594 B2 * 7/2014 Welle .................... G01F 23/296 367/908
9,068,876 B2 * 6/2015 Griessbaum ............ G01S 15/08
9,163,971 B2 * 10/2015 Welle ...................... G01F 22/00
9,354,100 B2 * 5/2016 Griessbaum .......... G01S 13/103
2012/0265486 A1 * 10/2012 Klofer ..................... G01F 23/80 702/166

(Continued)

FOREIGN PATENT DOCUMENTS

CN 116087908 B 6/2023
DE 4308373 A * 9/1994 ........... G01F 23/296

(Continued)

OTHER PUBLICATIONS

Machine translation of DE-4223346-C2 published May 2, 1996.*

*Primary Examiner* — Daniel S Larkin

(57) ABSTRACT

A method for installing and operating a level measuring device at a container, that is configured to hold a varying amount of a medium. The method includes a step in which a signal is emitted from the level measuring device into the container. An echo of the signal is captured and stored as a plurality of data points. In another step, a data set including at least a portion of the data points is fed into a feature detecting algorithm. Furthermore, a peak of the echo that represents the level of the medium in the container is determined. In yet another step, the determined peak is set as a portion of the echo that is to be evaluated for measuring the level of the medium. The feature detecting algorithm includes artificial intelligence.

13 Claims, 3 Drawing Sheets

(56) References Cited

U.S. PATENT DOCUMENTS

| | | | | |
|---|---|---|---|---|
| 2013/0132005 | A1* | 5/2013 | Welle | G01F 23/00 702/55 |
| 2015/0253177 | A1* | 9/2015 | Blodt | G01F 23/284 324/644 |
| 2023/0273060 | A1* | 8/2023 | Welle | G01F 23/284 73/290 R |

FOREIGN PATENT DOCUMENTS

| | | | | | |
|---|---|---|---|---|---|
| DE | 4223346 | C2 | | 5/1996 | |
| DE | 102005063079 | A | * | 7/2007 | G01F 23/284 |
| DE | 102011089427 | B | * | 8/2023 | G01F 23/284 |
| EP | 0961106 | A | * | 12/1999 | G01F 25/24 |
| EP | 1628119 | A2 | | 2/2006 | |
| EP | 3997425 | B1 | | 7/2023 | |
| WO | 2022124416 | A1 | | 6/2022 | |

* cited by examiner

METHOD FOR INSTALLING A LEVEL MEASURING DEVICE

TECHNICAL FIELD

The present disclosure relates to a method for installing a measuring device at a container that holds a varying level of a medium. The present disclosure also relates to a computer program product that is configured to perform such a method. Additionally, the present disclosure relates to a control unit for a level measuring device and a level measuring device, which are configured to perform the disclosed method, respectively. Furthermore, the invention relates to an industrial application with a container and a level measuring device that is configured to be installed through the disclosed method.

BACKGROUND

WO 2022/122416 A1 teaches a filling level measuring device for microwave-based determination of the filling level of a filling material in a container. The filling level measuring device comprises a reflection point arranged outside the container. The reflection point is configured to generate a reflection point echo signal. That reflection point echo signal is utilized for calibrating the filling level measuring device.

Several industrial processes rely on an exact measurement of a level of a medium, for example in a container. If a precise level measurement is to be achieved, the installation of a suitable level measuring device requires significant expertise and effort by a person. In several cases, such an installation requires even more expertise, for example in applications with foam, dust or agitators. At the same time, production lines in industrial processes are to be suitable for quick retooling. Thus, there may be a need for a method that allows for installing level measuring devices quickly with little or even no experience in the field of level measuring technology and for achieving precise level measurement. It is an object of the present disclosure to provide a method and suitable means for it which offer an improvement in at least one of these aspects.

SUMMARY

The object described above is achieved by a disclosed method for installing a level measuring device at a container, the container being configured to hold a varying amount of a medium. The method comprises a first step in which the level measuring device is attached at an installation position. In a second step of the disclosed method, a signal is emitted from the level measuring device into the container. An echo of the signal is captured during and at least temporarily stored as a plurality of data points. During the second step, a data set is derived from the plurality of data points through a compressing algorithm. Furthermore, the method comprises a third step in which the data set, which comprises at least one coefficient derived from the plurality of data points.

The data set is being fed into a feature detecting mechanism which determines a peak of the echo that represents a level of the medium in the container or a functional component of the container. Still further, the method comprises a fourth step in which the determined peak of the echo is set as a portion of the echo that to be evaluated for measuring the level of the medium or the presence of the functional component. According to the disclosed method, the feature detecting algorithm is embodied as an algorithm comprising artificial intelligence.

The object described above is also achieved by a computer program product that comprises a computer-readable code that is embodied on a non-transitory storage medium. The computer-readable program code is configured to perform the following steps when it is loaded into a memory of a computer. The computer-readable code is configured to receive a plurality of data points of an echo of a signal that has been emitted into a container.

The computer-readable program code is also configured to derive a data set from the plurality of data points.

The data set comprises at least one coefficient that is derived from the data points. Furthermore, the computer-readable program code is configured to transmit and provide the data set as an input for a feature detection algorithm. In addition to that, the computer-readable program code is configured to utilize the feature detecting algorithm to determine at least one peak of the echo, the peak representing the level of the medium in the container or the presence of a functional component. Still further, utilizing the computer-readable program code, the determined peak of the echo is set to be evaluated for measuring a level of the medium or the presence of the functional component. According to the disclosed computer program product, the feature detecting algorithm is embodied as an algorithm comprising artificial intelligence.

BRIEF DESCRIPTION OF THE DRAWINGS

In the following, the present disclosure is described in more detail in several figures. The figures are to be construed as mutually complementary. Particularly, identical numerals are to be construed as having the same technical meaning. The features of the embodiments shown in the figures may be combined with each other. Additionally, the features of the embodiments shown in the figures may also be combined with the embodiments outlined above and below. In particular, the figures show.

DETAILED DESCRIPTION

Figure 1:
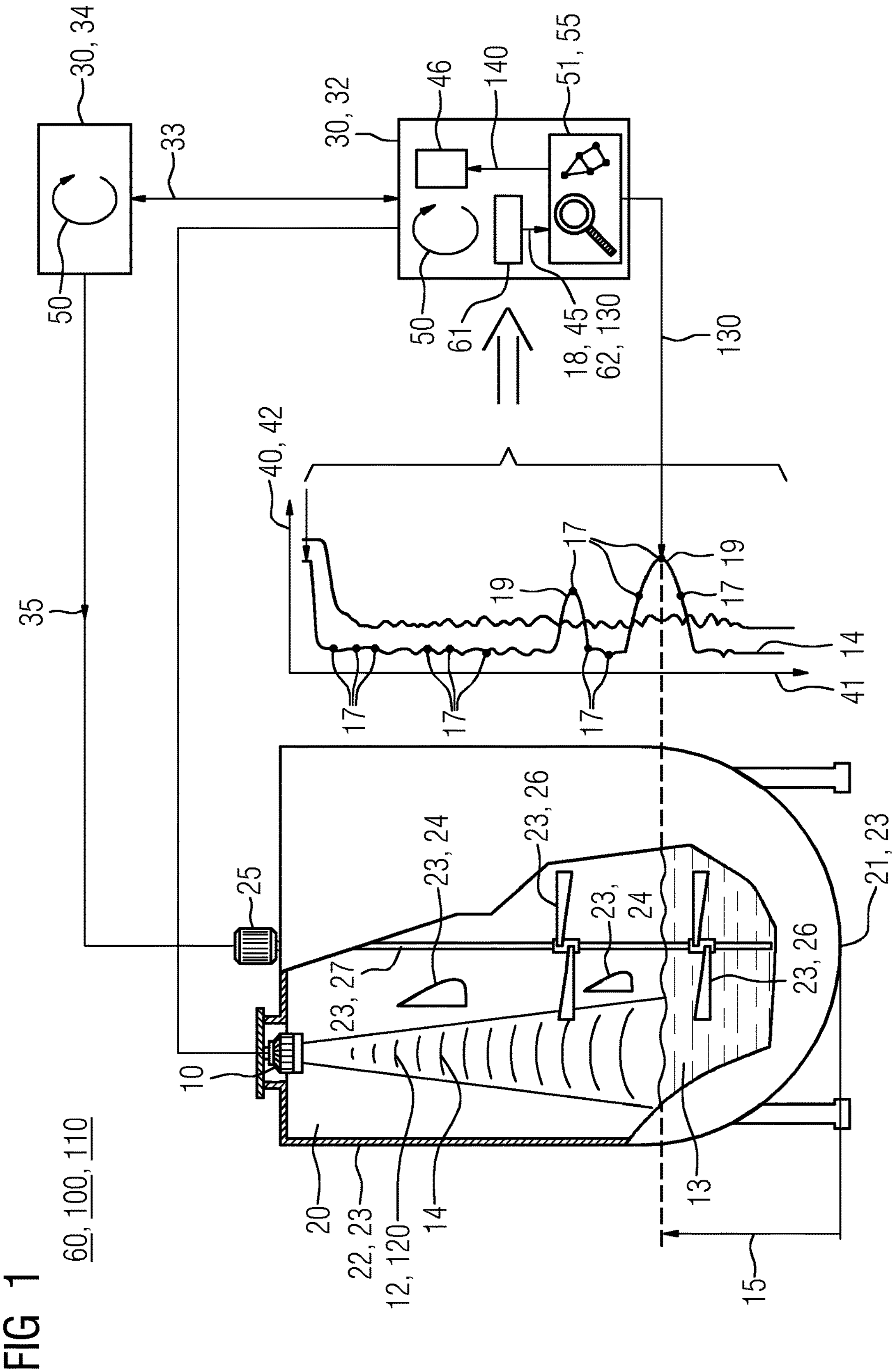
FIG. 1 illustrates an embodiment of the disclosed industrial application in which a first embodiment of the disclosed method is performed.

The disclosed method serves for installing a level measuring device at a container. The level measuring device may be attached to the container or in the vicinity of the container for measuring a varying level of a medium in that container. The container may be a tank, a silo, a chemical reactor, a well, or a channel. The medium may be any liquid or granular material like a powder, e.g. cement, an agricultural product, e.g., grain, or gravel. The container may be part of a production process, in which course the level of the medium may vary.

In a first step of the disclosed method, the level measuring device is attached at an installation position. Furthermore, the container may be at least partially filled with the medium. In a second step of the disclosed method, a signal is emitted from the measuring device into the container. The signal may be an electromagnetic signal, e.g., a radar pulse, or an ultrasound pulse. Furthermore, the signal may be a sweep, for example a frequency modulated continuous wave, also called a FMCW. The signal may also comprise a continuous carrier. The medium in the container or a functional component respectively is at least partially reflective for the signal. Furthermore, an echo of the signal, which is caused by an at least partial reflection of the signal at the surface of the medium or at surface of the functional component, is captured. The captured echo is stored at least temporarily as a plurality of data points. The echo may be captured and stored by the level measuring device or a component connected to the level measuring device.

During the second step, a data set is derived from the data points. The disclosed method also comprises a third step in which the data set is fed into a feature detecting algorithm. The data set comprises at least one coefficient derived from the data points that reflect the captured echo. The data set may be selected to omit data points that relate to at least one echo generated in a top portion of the container, where no medium is to be expected during normal operation of the pertinent production process. Thus, such data points are irrelevant and may be omitted when the data set is generated. In addition to that, the data set may be derived from the data points based on mathematical functions, for example. Such mathematical functions may comprise determining an arithmetic mean, a mean deviation, a median, a standard deviation, and a determination of Fast Fourier Transformation coefficients.

The data set may be derived from the data points by the level measuring device or a component connected to the level measuring device. The feature detecting algorithm may be embodied as a computer program product or as a part of a computer program product that may be run on the level measuring device or a component connected to the level measuring device. Since the data set may comprise a reduced amount of data, the data traffic necessary for feeding the data set into the feature detecting algorithm is also reduced. The data set may be assembled on the level measuring device and the feature detecting algorithm may be run on the component connected to the level measuring device. Since the data set comprises a reduced amount of data, the feature detecting algorithm is dealing with a smaller input, which in turn allows for running the feature detecting algorithm at high speeds even on hardware with limited computing power.

With the data set comprising a reduced amount of data, the data may be transmitted from the level measuring device and the component connected to it, for example, through a wireless connection. The feature detecting algorithm may be configured to evaluate the echo reflected in the data set and to identify characteristics of the echo. In the third step, the feature detecting algorithm is utilized to determine a peak of the echo that represents one of the level of the medium in the container and a functional component in the container. The echo may comprise several peaks, valleys, plateaus, etc. which may be caused by reflections from other things than the medium or the functional component, respectively. Particularly, the echo may comprise peaks caused by reflections of the signal from others functional components, such as a wall of the container, its bottom or mechanical components arranged inside the container, e.g., baffles, agitators. That feature detecting algorithm is configured to single out a peak in the data set that is caused by the reflection of the signal at the surface of the medium or the functional component.

In a fourth step of the disclosed method, the determined peak of the echo is set as the peak that is to be evaluated for measuring the level of the medium during normal operation or for a presence of the functional component. Furthermore, the peak representing the functional component may be set as an operational monitoring peak. Such an operational monitoring peak may be evaluated during an operation of the underlying production process. A periodically fluctuating peak for example may represent an activated agitator and the frequency of its fluctuation may mirror its rotational speed. The operational monitoring peak may be utilized to check the plausibility of other sensor readings in the underlying production process. The feature detecting algorithm may determine at least one characteristic feature of the corresponding peak that identifies it as the peak pertinent to the current level of the medium or the peak pertinent to the functional component. To that end, at least one corresponding parameter may be stored on the level measuring device or a component connected to the level measuring device.

In the disclosed method, the feature detecting algorithm is an algorithm that comprises artificial intelligence, i.e., an artificial intelligence component. Echoes caused by the medium in the container or by the functional components show features that distinguish them over echoes caused by signal reflections from mechanical components, i.e., other functional components. Among others, the disclosed method is based on the surprising finding that specific echoes, for example echoes from the surface of a medium, are distinguishable from other echoes with an algorithm that comprises artificial intelligence. As a consequence the disclosed method allows for facilitating the installation of a level measuring device. Especially, it allows for automating steps of the installation process which require extensive knowledge and experience in solutions when they are performed manually. Particularly, the disclosed method may be configured for at least one of identifying a specific functional component in an echo and identifying the level of the medium in an echo. Furthermore, the disclosed method may be utilized for re-calibrating an existing installation quickly. Altogether, the disclosed method enhances the user-friendliness of a level measuring device. The described method may be embodied as a computer-implemented method that may be performed on the level measuring device or a component connected to the level measuring device.

In an embodiment of the disclosed method, the artificial intelligence, i.e., the artificial intelligence component, is a neural network. The neural network may be trained based on training data that is derived from level measuring devices of the same type that are installed at different containers. The training data may be preprocessed and be feature engineered data from such level measuring devices. In addition to that, the training data may be annotated, using at least one of proprietary algorithms, filters and signal processing techniques. Based on such training data, neural networks are capable of distinguishing a broad variety of mechanical components by evaluating echoes caused by reflections at the surfaces of several different media.

The disclosed method is also based on the surprising finding that the precision that is obtainable in applications like optical character recognition or image recognition may be yielded at the analysis of echoes as well. Neural networks with enhanced recognition capabilities are readily available in a wide range of degrees of precision and speed. Additionally, future progress in the field of optical character recognition or image recognition may be easily transferred into the disclosed method. Thus, the feature detecting algorithm may be embodied as a modular component of a computer program that is utilized to implement the disclosed method.

Additionally, the disclosed method may also comprise a step in which a type of the functional component is determined. Based on that, a type of the application, e.g., the process, in which the container is utilized, may be determined based on at least the type of the functional component. For example, a peak of an echo may be determined to represent at least one baffle at the bottom of the container. Furthermore, a type of an agitator may be determined. By evaluating the present types of functional components, the kind of application may be determined or at least be narrowed down to a reduced number of possibilities. Based on the determined type of the application, at least one additional setting parameter of the level measuring device may be determined, which is to be adjusted for operation. As a consequence, only pertinent settings are requested from the user during the installation process. In a complementary manner, at least one type of application may be ruled out. Thus, additional setting parameters which only apply to ruled out types of application may be suppressed. Consequently, a user may be prompted to only necessary setting steps. That facilitates the installation process of the level measuring device even further.

The disclosed method may also comprise a step in which the type of the medium is determined based on at least one of the determined type of the application and the determined type of the functional component. Particularly, it may be determined if the medium in the container is a liquid or a granular material. Depending on that, a propensity to form cones may be determined as an additional parameter setting. Coarse granular material like gravel or corn may form cones when it is poured. Liquids may form funnel-shapes when they are intensely stirred. Thus, depending on the type of medium and the type of application, such additional parameter settings may have to be taken into account when measuring a current level. With such an automated determination of the type of the medium, a user may quickly be prompted to the corresponding settings of the level measuring device. The fact that an artificial intelligence, as it is used in the disclosed method, is also suitable to determine the types of different functional components, application types and types of media, is another surprising finding.

In another embodiment, the disclosed method comprises a step in which at least one peak of the echo is determined that represents an antenna reflection of the level measuring device. Such an antenna reflection is a peak in the echo that is caused by components of the level measuring device itself. In another step, the determined at least one peak that represents the antenna reflection is set as a wear monitoring peak. In several applications, antenna reflections indicate wear of the level measuring device. The artificial intelligence component utilized in the disclosed method may be embodied to detect at least one of wear at the level measuring device. Particularly, the artificial intelligence component is capable of distinguishing antenna reflections from other peaks in the echo and is also capable of consistently monitoring it. Consequently, the disclosed method may also be used for monitoring the operation of the underlying production process even more precisely.

Furthermore, the compressing algorithm utilized in the second step may be configured to measure at least one characteristic of a peak among the data points and to derive the at least one coefficient from the data points. The data points may be intensity values arranged on a time scale. The at least one characteristic may comprise at least one of an area below the echo in a selectable range, an area enveloped by the peak and a reference curve, an amplitude difference between the echo and the reference curve, a degree of asymmetry of at least a portion of the echo, a width of the peak, an absolute position of the peak and the amplitude of the peak. The reference curve may be an echo from a previous measurement, for example when the level measuring device is newly installed. Alternatively, the reference curve may be a curve defined by at least one of a user, a look-up table, an algorithm or an artificial intelligence.

The reference curve may be fixed or an adaptive curve, i.e., a reference curve that changes during operation of the level measuring device. Thus, the disclosed method is configured to evaluate the echo and its data points in several ways. The compressing algorithm may be configured to identify peaks which exhibit distinct and characteristic features. Particularly, the compressing algorithm component may be configured to determine a score of a peak pertaining to such features and to rank such peaks based on a ranking score. Such a score may relate to attributes like peak shape, amplitude, symmetry, or a combination of these, especially in comparison to present training data. Based on such coefficients, the artificial intelligence utilized in the disclosed method may be configured to detect at least one characteristic for measuring the level of the medium, an indication or a degree of wear present in the underlying production process. Therefore, the disclosed method is versatile and self-adaptive.

In yet another embodiment of the disclosed method, the method comprises a step in which at least one of a minimum level and a maximum level of the medium are provided, e.g., entered. The minimum level or the maximum level respectively may be entered by at least one of a user and a computer program that is run on a hardware platform which does not belong to the level measuring device, and which is in communication with the level measuring device. The minimum level and maximum level in a container are the most basic calibration quantities which may be understood easiest. In another step, at least one calibration parameter for evaluating echoes is determined. The at least one calibration parameter is stored in a memory that is associated to the level measuring device. The at least one calibration parameter may be any quantity that is derived based on at least one of the minimum level and the maximum level. The at least one calibration parameter may be configured to define at shift of the peak representing the current level within an echo when the level rises from minimum level to maximum level or falls from maximum level to minimum level. Consequently, the disclosed method is suitable for a simple, and thus, less error-prone installation of a level measuring device.

The disclosed method may further comprise a step in which at least one peak of the echo that represents a degree of fouling in the container or at the level measuring device. is determined. In another step, the at least one peak that represents a degree of fouling is set as another operational monitoring peak. Fouling may be an aggregation of remnants of the medium, for example at baffles inside the container or at the level measuring device. With such fouling, a peak caused by such a baffle may be modified. Thus the at least one peak that represents fouling may coincide with a peak that represent a functional component. With the corresponding peak being determined, echoes may be evaluated locally, for example in the level measuring device, and the data traffic for monitoring the underlying production process is reduced. Thus, the recognition capabilities of the artificial intelligence component used for the installation of the level measuring device are further utilized to automatically provide for additional functions. Thus, even complex installations of level measuring device are facilitated with the disclosed method.

In the disclosed method, the feature detecting algorithm may be run on at least one of a local control unit of the level measuring device and a remote control unit that is connected to the level measuring device. The local control unit may be a control unit that is installed in the field with the level measuring device. The remote control unit may be a control unit that is not installed in the field and connects to the level measuring device through a suitable communication-capable data connection. The remote control unit may be a superordinate control unit that may be configured also to control components of the underlying production process other than the level measuring device. Furthermore, the remote control unit may also be a device that is not connected to level measuring device permanently, for example, a cell phone, a tablet or a laptop computer. The disclosed method may be computer-implemented to run on either of the local control unit or the remote control unit. Alternatively, the disclosed method may be partly performed on the local control unit and the remote control unit, for example, as two interacting software modules, each being run either on the local control unit or the remote control unit. Thus, the disclosed method may be implemented on a variety of types of existing infrastructure, for example, different architectures of the underlying production process.

The object outlined above is also achieved by the disclosed computer program product. The computer program product comprises a computer-readable program code which is embodied on a non-transitory storage medium. The computer-readable program code is configured to perform the following steps when it is loaded into a memory of a computer. These steps comprise a step in which a plurality of data points of an echo of a signal is received. The data set may be selected to omit data points that are irrelevant for further evaluation. The signal is emitted into a container which is at least partially filled with a medium. The data set may comprise several peaks, each of them potentially representing or corresponding to the current level of the medium. In another step, a data set is derived from the plurality of data points through a compressing algorithm. The data set comprises at least one coefficient that is derived from at least a portion of the data points through the compressing algorithm. The at least one coefficient represents at least one peak in the captured echo.

The data set comprises at least a portion of the data points and is provided as input for a feature detecting algorithm. In a further step, the feature detecting algorithm is utilized to determine at least one peak in the echo that represents the level of the medium in the container. To that end, the feature detecting algorithm may be configured to select a peak among the peaks in the data set based on their features, for example their geometric properties when shown in a diagram with a timescale. Such geometric properties may be mirrored in the at least one coefficient. In a subsequent step, the determined peak of the echo is set as the peak that is to be evaluated for measuring the level of the medium. At least one characteristic feature of that peak may be set as a characteristic to look for when future echoes, and thus future data sets, are generated. In the disclosed method, the feature detecting algorithm is embodied as an algorithm comprising artificial intelligence, i.e., an artificial intelligence component, for example a neural network.

The computer program product may be embodied wholly or partially as software of may be hard-wired into hardware, for example an integrated circuit or a chip. Furthermore, the computer program product may be embodied monolithically and thus may be run on a single hardware platform. Such a single hardware platform may be a control unit associated with a level measuring device, for example a local control unit or a remote control unit. Alternatively, the computer program product may be embodied in a modular manner, comprising several partial programs run on separate hardware platforms and which are configured to interact with each other to provide the functionality of the disclosed computer program product. Furthermore, the computer program product may be configured to perform at least one embodiment of the disclosed method. Therefore, the features of the disclosed method also apply to the disclosed computer program product correspondingly.

Furthermore, the object described above is also achieved by the disclosed control unit. The control unit is configured for controlling an operation of a level measuring device. The control unit comprises a processor and a memory for storing and running a computer program product. The control unit is further configured to perform at least one embodiment of the disclosed method. To that end, a computer program product according to one of the previously described embodiments of the disclosed computer program product may be stored on the control unit. The control unit may be a local control unit of the level measuring device or a remote control unit that is connected to a corresponding level measuring device. Thus, the features and benefits of the disclosed method may also be applied to the disclosed control unit.

The object outlined above is also achieved by the disclosed level measuring device which comprises an emitter that is configured for emitting signals. Furthermore, the level measuring device comprises a receiver that is configured to receive echoes of the signals. Still further, the level measuring device comprises a control unit which is connected to the receiver. The emitter and the receiver may be configured to emit and receiver radar or ultrasound signals or echoes respectively. The control unit is configured to perform at least one embodiment of the disclosed method, as described above. Thus, the features and benefits of the disclosed method apply to the discloses level measuring device accordingly. Furthermore, the control unit of the disclosed level measuring device may be a control unit according to one of the embodiments outlined above. As a consequence, the features and benefits of the disclosed method may also be applied to the disclosed level measuring device.

Moreover, the object described above is also achieved by the disclosed industrial application that comprises a container that is configured to hold a medium with a varying level. The disclosed industrial application also comprises a level measuring device which may be connected to the container. The level measuring device is configured to measure the level of the medium in the container. Furthermore, the level measuring device is configured to be installed though a method according to one of the embodiments of the disclosed method, as described above. Consequently, the features and benefits of the disclosed method may be applied to the disclosed industrial application accordingly.

Now, turning to the figures, the disclosed teaching is illustrated in further detail. FIG. 1 shows an embodiment of the disclosed industrial application 60 in which a first embodiment of the disclosed method 100 is performed. The industrial application 60 comprises a container 20 with a bottom 21 and walls 22, the container 20 being configured to hold a medium 13, which may be a liquid or a granular material. Baffles 24 are positioned at the wall 22 of the container 20 to influence the medium 13 when it is agitated. Furthermore, the container 20 is equipped with an agitator that comprises a shaft 27 that is driven by a drive 25, which may be an electric motor. Agitator blades 26 are attached to the shaft 27 which are configured to agitate the medium 13. The bottom 21, the walls 22 the baffles 24, the agitator blades 26 and the shaft 27 form functional components 23 of the container 20 which may affect an echo 14 inside the container 20.

Furthermore, the industrial application 60 comprises a level measuring device 10 that is configured to measure a current level 15 of the medium 13 in the container 20. The level measuring device 10 is configured to emit signals 12 and to receive their echoes 14. The signals may be radar signals or ultrasound signals. Correspondingly, the echoes 14 may be radar echoes or ultrasound echoes. The industrial application 60 is a part of a production process, that is not shown in further detail in FIG. 1. The level measuring device 10 is connected to a control unit 30 that is embodied as a local control unit 32. The local control unit 32 belongs to the level measuring device 10 and is configured to evaluate the echoes 14 received by the level measuring device 10. Furthermore, the drive 25 is connected to a control unit 30 that is embodied as a remote control unit 34. The remote control unit 34 is part of the control system of the production process and is configured to send control signals 35 to the drive 25. Additionally, the local control unit 32 and the remote control unit 34 are connected to each other through a communication-capable data connection 33. The local control unit 32 and the remote control unit 34 are equipped with a computer program product 50 that is configured to perform the disclosed method 100. To that end, the computer program product 50 comprises a compressing algorithm 61 and an artificial intelligence component 55, which is embodied as a neural network. The artificial intelligence component 55 serves as a feature detecting algorithm 51.

The disclosed method 100 serves for installing the level measuring device 10 into the industrial application 60. The method 100 comprises a first step 110, in which the level measuring device 10 is attached to the container 20 at its intended installation position. Furthermore, the container 20 is at least partially filled with the medium 13. In FIG. 1, the first step 110 has already been performed. A second step 120 is performed in which a signal 12 is emitted by the level measuring device 10. The signal 12 is reflected by the medium 13 and an agitator blade 26 that is positioned above the level 15 of the medium 13. The reflected signal 12 forms an echo 14 which is captured, i.e., received, by the level measuring device 10. The received echo 14 is at least temporarily stored in a memory on the local control unit 32. In FIG. 1, the received echo 14 is shown in a diagram 40 with a timescale 41 and an intensity scale 42. The diagram 40 is arranged substantially vertically since the timescale 41 corresponds to an axis substantially perpendicular to the level 15 of the medium 13. The captured echo 14 is at least temporarily stored as a multiplicity of data points 17.

During the second step 120, at least a portion of the data points 17 is fed into the compressing algorithm 61. The compressing algorithm 61 derives coefficients 62 from the data points 17, which form a data set 18. In a third step 130 of the disclosed method 100, the data set 18 is fed into the artificial intelligence component 55 which serves as the feature detecting algorithm 51. The feeding is symbolized by arrow 45 in FIG. 1. Furthermore, the feature detecting algorithm 51 is utilized in the third step 130 to determine a peak 19 in the echo 14, i.e., in the data set 18, which represents the level 15 of the medium 13. To that end, the feature detecting algorithm 51 is configured to evaluate characteristics of the echo 14 and to identify which of the peaks 19 in the echo 14 relates to the level 15 of the medium 13. The feature detecting algorithm 51 may comprise a pattern recognition module that is configured to evaluate coefficients 62, which are derived from the echo 14.

In FIG. 1, the lower peak 19 in the diagram 40 is detected to represent the current level 15 of the medium 13. Furthermore, the disclosed method 100 comprises a fourth step 140, in which the determined peak 19 is set as a portion of the echo 14 that is to be evaluated for measuring the level 15 of the medium 13. At least one geometric property of the corresponding peak 19 is at least temporarily stored as at least one parameter 46. The at least one parameter 46 is configured to allow for identifying the corresponding peak 19 in future level measurements, even when it is at a different position on the timescale 41. The feature detecting algorithm 51 may be configured to quantify at least one geometric property of the corresponding peak 19 as the at least one parameter 46 and to compare it to peaks 19 in future echoes 14. The feature detecting algorithm 51 may be configured to determine the level 15 of the medium 13 and to communicate the determined level 15 to the remote control unit 34. The remote control unit 34 may be configured to send a control signal 35 to the drive 25 or to a supply valve associated with the container 20 to control the underlying production process based on information about the current level 15 of the medium 13.

Figure 2:
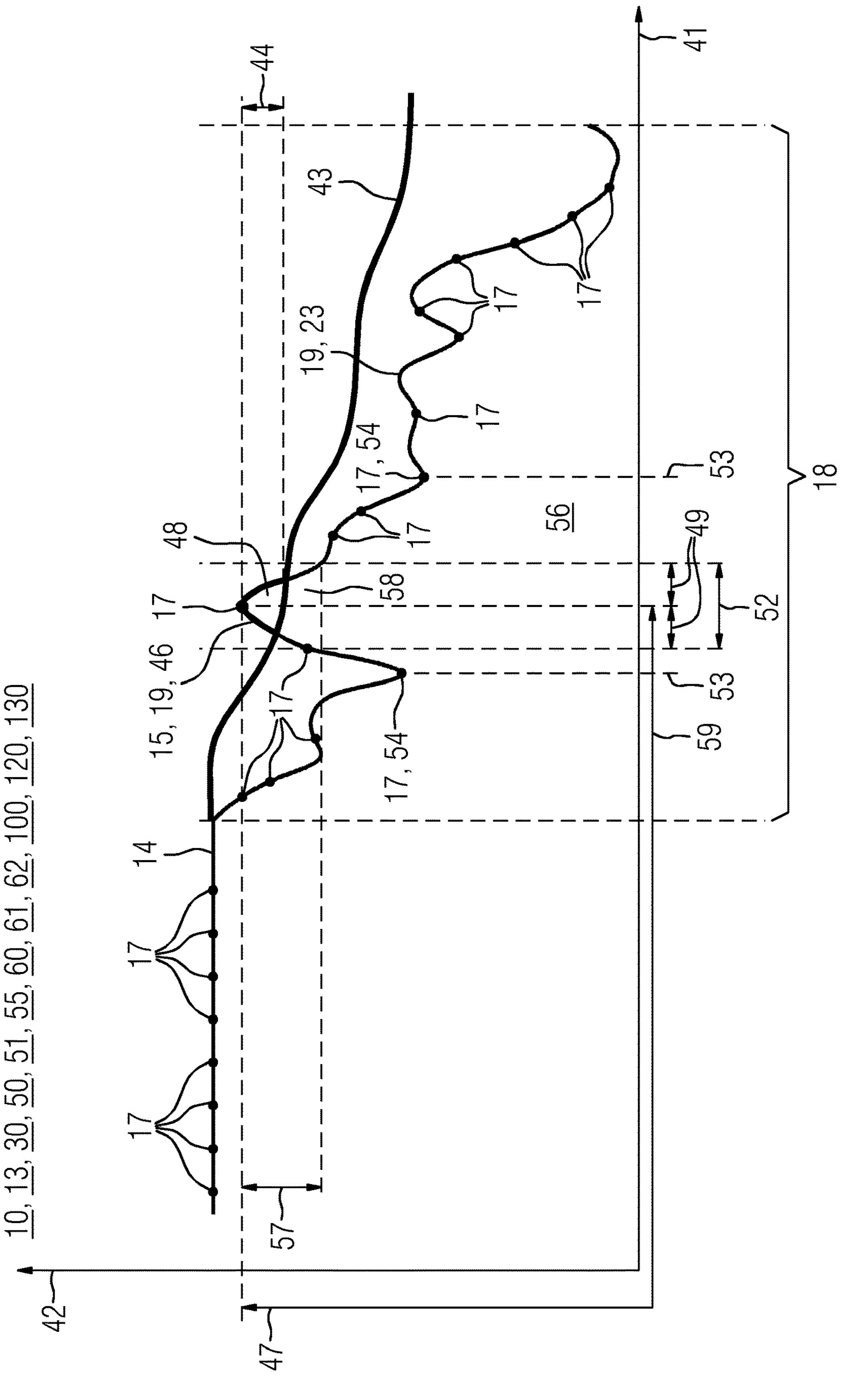
FIG. 2 illustrates a stage of a second embodiment of the disclosed method.

A second step 120 and third step 130 of a second embodiment of the disclosed method 100 are shown in FIG. 2. For the second embodiment according to FIG. 2 it is assumed that the first step 110 has already been performed successfully. The second step 120 is illustrated by a diagram 40 which has a timescale 41 and an intensity scale 42. The diagram 40 shows an echo 14 which comprises multiple data points 17, from which a data set 18 is to be derived. During the second step 120, a compressing algorithm 61 assesses the data points 17. In order to recognize features of the echo 14, its peaks 19 are detected, which may be construed as local maxima of the echo 14. The peaks 19 are further analyzed to detect if they represent the level 15 of the medium 13. To that end, a reference curve 43 is applied and overlaid with the echo 14.

The assessment performed by the feature detecting algorithm 51 comprises that in the vicinity of a peak 19, an area 58 below the echo 14 is determined. The horizontal basis for that area 58 is defined by an offset 57 below the peak 19. Furthermore, two local minima 54, adjacent to the peak 19 may be determined, which in turn define valley positions 53 of the echo 14. An area 56 below the echo 14 between the valley positions 53 may be determined to characterize the corresponding peak 19. Additionally, an area 48 defined by the echo 14 and the reference curve 43 may be determined to characterize the peak 19. Still further, at least one of a horizontal position 59 of the peak 19 within the dataset 18, an absolute amplitude 47 of the peak 19 and a relative amplitude 44 of the peak 19 may be determined. The relative amplitude 44 may be defined in relation to the reference curve 43. Additionally, a width 52 of the echo 14 in the vicinity of the peak 19 may be determined. Based on the width 52 of the echo 14 in the vicinity of the peak 19, a degree of asymmetry of the peak 19 may be determined. To that end, two so-called half-widths 49 of the peak 19 may be determined, which quantify the skewedness of the echo 14 in the vicinity of the peak 19.

During the second step 120, at least one of these quantities is determined by the compressing algorithm 61, which stores the determined characteristics as coefficients 62. The coefficients 62 are stored in a data set 18, that reflects at least the peaks 19 of the echo 14. The data set 18 is fed into a feature detecting algorithm 51 during a third step 130 of the method 100. The feature detecting algorithm 51 may be a trained neural network that is configured to determine a degree of membership with corresponding quantities of a peak 19 that represents the level 15 of a medium 13 based on the corresponding coefficients 62. The peak 19 shown at the lefthand side in FIG. 2 is determined to be the peak 19 that represents the level 15 of the medium 13. That peak 19 and quantities that allow for recognizing it when it moves to a different horizontal position of the echo 13 corresponding to a rising of falling level 15. In the third step 130, at least one parameter 46 is determined among the coefficients 62 described which allows for recognizing which peak 19 in an echo 14 that represents the level 15 of the medium 13.

The assessment described above may be performed for the peak 19 shown on the righthand side of FIG. 2. That peak 19 may be determined to represent a functional component 23 in the underlying industrial application 60, e.g., a bottom 21, a wall 22, a baffle 24 a shaft 27 or an agitator blade 26 in the container 20, as shown in FIG. 1. Correspondingly, at least one parameter 46 among the coefficients 62 may be determined which allows for recognizing that peak 19 pertaining to the functional component 23 in future measurements. The at least one parameter 46 which allows for recognizing at least one of the peaks 19 is at least temporarily stored on the level measuring device 10 during a fourth step 140 of the disclosed method 100. The disclosed method 100 may be performed by a computer program product 50 which may be run on a control unit 30 associated with the level measuring device 10.

Figure 3:
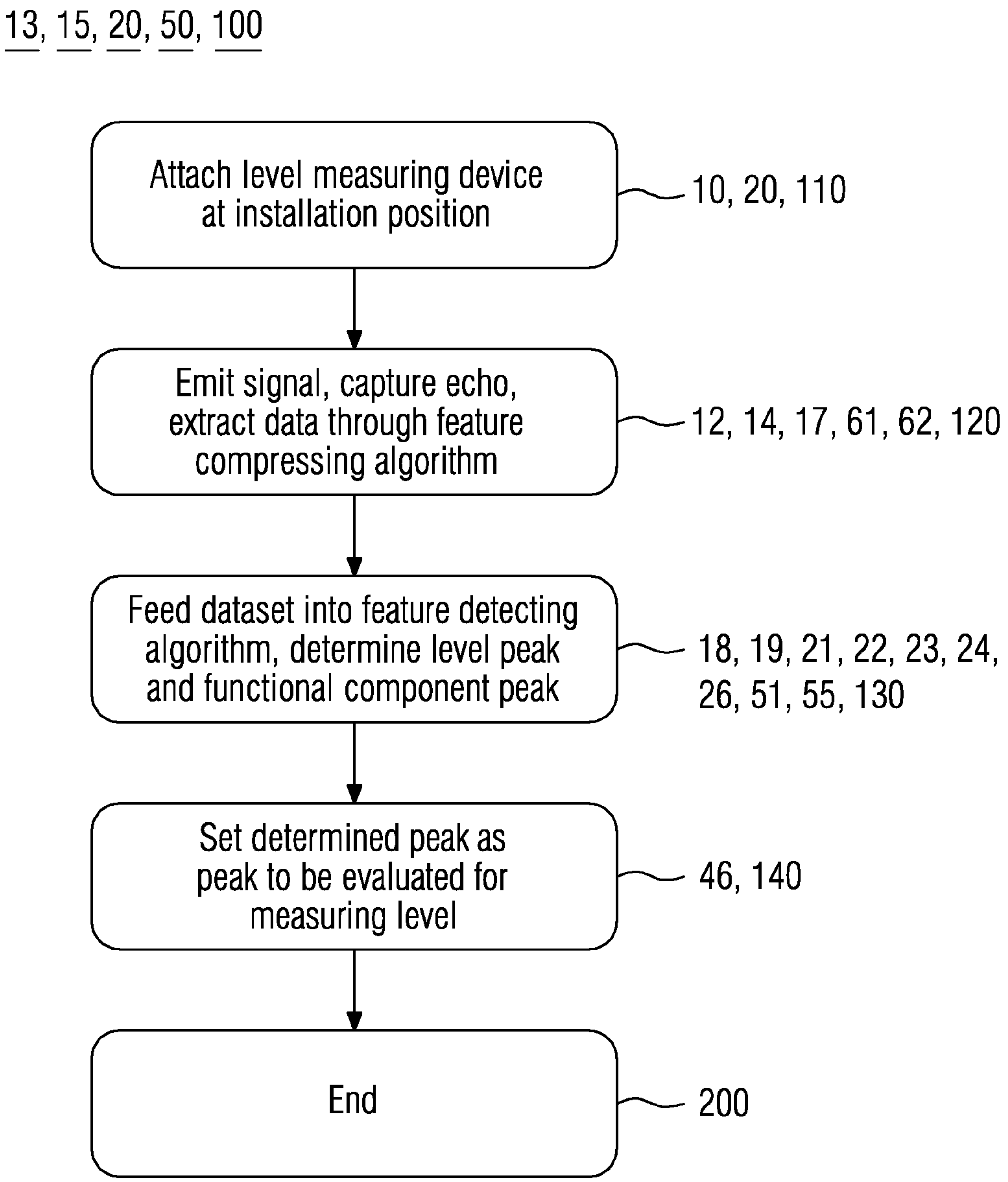
FIG. 3 a schematic flow chart of a third embodiment of the disclose method.

FIG. 3 shows a third embodiment of the disclosed method 100 in a flow chart. The disclosed method 100 serves for installing a level measuring device 10 at a container 20. The level measuring device 10 is configured for measuring a varying level 15 of a medium 13 in that container 20. The medium 13 may be any liquid or granular material. In other terms, the medium 13 may be any product that behaves at least similar to a liquid. The container 20 may be part of a production process in an industrial application 60, in which course the level 15 of the medium 13 may vary. In a first step 110 of the disclosed method 100, the level measuring device 10 is attached at an installation position and the container 20 is at least partially filled with the medium 13.

In a subsequent second step 120 of the disclosed method 100, a signal 12 is emitted from the measuring device 10 into the container 20. The signal 12 may be an electromagnetic signal, e.g., a radar signal, or an ultrasound signal. The medium 13 in the container 20 is at least partially reflective for the signal 12. Furthermore, an echo 14 of the signal 12, which is caused by an at least partial reflection of the signal 12 at the surface of the medium 13, is captured, i.e., received by the level measuring device 10. The captured echo 14 is stored at least temporarily as a plurality of data points 17. Furthermore, at least a portion of the data points 17 is fed into a compressing algorithm 61 which determines at least one coefficient 62 based on the data points 17. The coefficients 62 are at least temporarily stored as a data set 18.

The disclosed method 100 also comprises a third step 130 in which the data set 18 is fed into a feature detecting algorithm 51. The data set 18 comprises at least one coefficient 62 that is derived from at least a portion of the data points 17. The data set 18 may be selected to omit data points 17 that relate to an echo 14 generated in a top portion of the container 20, where no medium 13 is to be expected during normal operation of the pertinent production process. Thus, such data points 17 are irrelevant and may be omitted when the data set 18 is generated. The data set 18 may be derived from the data points 17 by the level measuring device 10 or a component connected to the level measuring device 10, for example, a control unit 30. The feature detecting algorithm 51 may be embodied as a computer program product 50 or as a part of a computer program product 50 that may be run on the level measuring device 10 or a component connected to the level measuring device, for example, a control unit 30. The feature detecting algorithm 51 may be configured to evaluate the echo 14 reflected in the data set 18 and to identify characteristics of the echo 14, or in other terms, features of the echo 14. In the third step 130, the feature detecting algorithm 51 is utilized to determine a peak 19 of the echo 14 that represents the level 15 of the medium 15 in the container 20. The echo 14 may comprise several peaks 19, valleys, plateaus, etc., which may be caused by reflections from other things than the medium 13. Particularly, the echo 14 may comprise peaks 19 caused by reflections of the signal 12 from a wall 22 of the container 20, its bottom 21 or mechanical components arranged inside the container 20, e.g., baffles 24, agitator blades 26. Such mechanical components form functional components 23 of the container. The feature detecting algorithm 51 is configured to single out a peak 19 in the data set 18 that is caused by the reflection of the signal 12 at the surface of the medium 13. To that end, the feature detecting algorithm 51 is configured to identify at least one coefficient that reflects the corresponding peak 19.

In a fourth step 140 of the disclosed method, the determined peak 19 of the echo 14 is set as the peak 19 that is to be evaluated for measuring the level 15 of the medium 13 during normal operation. To that end, the feature detecting algorithm 51 may determine at least one characteristic feature of the corresponding peak 19 that identifies it as the peak19 pertinent to the current level 15 of the medium 13. The feature detecting algorithm is configured to determine at least one parameter 46 among the coefficients 62 which allows for monitoring the determined peak 19. The at least one corresponding parameter 46 may be stored on the level measuring device 10 or a component connected to the level measuring device 10, for example a control unit 30.

In the disclosed method 100, the feature detecting algorithm 51 comprises an artificial intelligence 55 component. Echoes 14 caused by the medium 13 in the container 20 show features that distinguish them over echoes 14 caused by signal reflections from other mechanical components. The data points 17 resulting from such an echo 14 are compressed into a data set 18 that comprises at least one coefficient 62. Based on such a compression, the feature detecting algorithm 51 is dealing with a reduced amount of input data, which in turn allows for a fast evaluation of the underlying echo 14. Among others, the disclosed method 100 is based on the surprising finding that echoes 14 from the surface of a medium 13 are distinguishable from other echoes 14 with an artificial intelligence 55.

The invention claimed is:

1. A method for installing and operating a level measuring device at a container, the container being configured to hold a varying amount of a medium, the method comprising:

Attaching the level measuring device at an installation position;

Emitting a signal from the level measuring device into the container, capturing an echo of the signal and at least temporarily storing the echo as a plurality of data points and extracting a data set from the plurality data points through a compressing algorithm;

Feeding the data set comprising at least one coefficients into a feature detecting algorithm, determining a peak of the echo that represents one of a level of the medium in the container and a functional component connected to the container;

Setting the determined peak as a portion of the echo that is to be evaluated for measuring the level of the medium or the presence of the functional component;

wherein the feature detecting algorithm comprises artificial intelligence.

2. The method according to claim 1, wherein the artificial intelligence is a neural network, the neural network being trained based on training data derived from level measuring devices of a same type being installed at different containers.

3. The method according to claim 1, the method further comprising:

Determining a type of the functional component and determining a type of the application in which the container is utilized based on at least the type of the functional component;

Determining a type of at least one additional setting parameter of the level measuring device based on the determined type of the application.

4. The method according to claim 3, the method further comprising:

Determining a type of the medium based on at least one of the determined type of the application and the determined type of the functional component.

5. The method according to claim 1, the method further comprising:

Determining at least one peak of the echo that represents an antenna reflection of the level measuring device;

Setting the determined at least one peak that represents the antenna reflection as a wear monitoring peak.

6. The method according to claim 1, wherein the at least one characteristic comprises at least one of an area below the echo in a selectable range, an area enveloped by the peak and a reference curve, an amplitude difference between the echo and the reference curve, a degree of asymmetry of at least a portion of the echo, a width of the peak, an absolute position of the peak, and an the amplitude of the peak.

7. The method according to claim 1, the method further comprising:

Providing at least one of a minimum level and a maximum level of the medium;

Determining at least one calibration parameter for evaluating echoes and storing the at least one calibration parameter in a memory associated to the level measuring device.

8. The method according to claim 1, the method further comprising:

Determining at least one peak of the echo that represents a degree of fouling in the container or at the level measuring device;

Setting the at least one peak that represents a degree of fouling as another operational monitoring peak.

9. The method according to claim 1, wherein the feature detecting algorithm is run on a local control unit of the level measuring device or on a remote control unit that is connected to the level measuring device.

10. An industrial application comprising a container that is configured to hold a medium with a varying level and a level measuring device configured to measure the level of the medium in the container, the level measuring device being configured to be installed and operated through the method according to claim 1.

11. A computer program product comprising a computer-readable program code embodied on a non-transitory storage medium, which when loaded into a memory of a computer, causes the computer to perform the following:

Receiving a plurality of data points of an echo of a signal that has been emitted into a container which is at least partially filled with a medium;

Extracting a data set from the plurality of data points which comprises at least a portion of the data points and providing the data set as input for a feature detecting algorithm;

Utilizing the feature detecting algorithm to determine at least one peak in the echo that represents the level of the medium in the container;

Setting the detected peak of the echo that is to be evaluated for measuring the level of the medium;

wherein the feature detecting algorithm is embodied as an artificial intelligence.

12. A control unit configured for controlling an operation of a level measuring device, the control unit comprising a processor and a memory for storing and running a computer program product, the control unit comprising a computer program product, the computer program product being embodied according to claim 11.

13. A level measuring device comprising an emitter configured for emitting signals, a receiver configured for receiving echoes of the signals and a control unit connected to the receiver, the control unit comprising a computer program product, the computer program product being embodied according to claim 11.

* * * * *